(12) United States Patent
Chang et al.

(10) Patent No.: US 11,817,782 B2
(45) Date of Patent: Nov. 14, 2023

(54) INVERTER HAVING CONVERTERS WITH COUPLED INDUCTORS

(71) Applicant: I SHOU UNIVERSITY, Kaohsiung (TW)

(72) Inventors: Chien-Hsuan Chang, Kaohsiung (TW); Yi-Fan Chen, Kaohsiung (TW)

(73) Assignee: I SHOU UNIVERSITY, Kaohsiung (TW)

( * ) Notice: Subject to any disclaimer, the term of this patent is extended or adjusted under 35 U.S.C. 154(b) by 147 days.

(21) Appl. No.: 17/569,546

(22) Filed: Jan. 6, 2022

(65) Prior Publication Data

US 2023/0068053 A1 Mar. 2, 2023

(30) Foreign Application Priority Data

Sep. 2, 2021 (TW) .................................. 110132680

(51) Int. Cl.
*H02M 3/158* (2006.01)
*H02M 7/48* (2007.01)
*H02M 1/00* (2006.01)

(52) U.S. Cl.
CPC ........... *H02M 3/158* (2013.01); *H02M 1/007* (2021.05); *H02M 1/0054* (2021.05); *H02M 3/1582* (2013.01); *H02M 7/4807* (2013.01)

(58) Field of Classification Search
CPC ........ H02M 7/42; H02M 7/49; H02M 3/1582; H02M 7/48; H02M 7/5387; H02M 3/33584; H02M 7/537
See application file for complete search history.

(56) References Cited

U.S. PATENT DOCUMENTS

| | | | |
|---|---|---|---|
| 9,118,259 B2 | 8/2015 | Ye | |
| 9,281,759 B2 * | 3/2016 | Lee | .................... H02M 7/53871 |
| 2011/0103117 A1 * | 5/2011 | Yoneda | .................... H02M 7/48 363/132 |
| 2018/0115256 A1 * | 4/2018 | Ho | .......................... H02M 7/797 |
| 2018/0175743 A1 * | 6/2018 | Mizokami | ......... H02M 7/53871 |

FOREIGN PATENT DOCUMENTS

| | | | | |
|---|---|---|---|---|
| CN | 113364322 A * | 9/2021 | ........ | H02M 7/53871 |
| EP | 2621075 A2 * | 7/2013 | ........ | H02M 7/53871 |
| TW | 201338390 A | 9/2013 | | |

(Continued)

OTHER PUBLICATIONS

Search Report appended to an Office Action, which was issued to Taiwanese counterpart application No. 110132680 by the TIPO dated May 23, 2022 with an English translation thereof, 2 pages.

*Primary Examiner* — Harry R Behm
*Assistant Examiner* — Yahveh Comas Torres
(74) *Attorney, Agent, or Firm* — Nixon & Vanderhye PC

(57) ABSTRACT

An inverter device includes a converter circuit and a filter. The converter circuit converts a DC input voltage into an AC intermediate voltage based on six control signals, and includes first and second converters. Each of the first and second converters includes three switches, two diodes and a coupled inductor circuit. The switches of the first converter operate respectively based on three of the control signals. The switches of the second converter operate respectively based on the other three of the control signals. The filter filters the AC intermediate voltage to generate an AC output voltage.

8 Claims, 13 Drawing Sheets

(56) References Cited

FOREIGN PATENT DOCUMENTS

| | | |
|---|---|---|
| TW | 201407917 A | 2/2014 |
| TW | 201427248 A | 7/2014 |
| TW | 708472 B | 10/2020 |
| TW | 733403 B | 7/2021 |
| WO | WO-2017038117 A1 * | 3/2017 ........ H02M 7/53871 |

* cited by examiner

INVERTER HAVING CONVERTERS WITH COUPLED INDUCTORS

CROSS-REFERENCE TO RELATED APPLICATION

This application claims priority of Taiwanese Patent Application No. 110132680, filed on Sep. 2, 2021.

FIELD

The disclosure relates to power conversion, and more particularly to an inverter device.

BACKGROUND

A conventional inverter device is connected between a photovoltaic module and a power grid, and converts direct current (DC) power provided by the photovoltaic module into alternating current (AC) power supplied to the power grid. The conventional inverter device includes an input capacitor, a boost DC-to-DC converter, a buck inverter and a filter. The boost DC-to-DC converter is connected to a parallel connection of the input capacitor and the photovoltaic module to receive a DC input voltage, and converts the DC input voltage into a DC intermediate voltage. The boost DC-to-DC converter includes at least an electrolytic capacitor and a plurality of switches. The buck inverter is connected to the boost DC-to-DC converter to receive the DC intermediate voltage, and converts the DC intermediate voltage into an AC intermediate voltage. The buck inverter includes at least a plurality of switches. The filter is connected to the buck inverter and the power grid, is to receive the AC intermediate voltage from the buck inverter, and filters the AC intermediate voltage to generate an AC output voltage for receipt by the power grid.

However, the conventional inverter device has a small voltage gain. In addition, because of two-stage power conversion (i.e., the switches of the boost DC-to-DC converter and the buck inverter constantly transition between conduction and non-conduction), the conventional inverter device has high power loss and thus low power conversion efficiency. Moreover, parasitic capacitances exist between the photovoltaic module and ground, so the photovoltaic module disadvantageously has a large leakage current which would cause electromagnetic interference.

SUMMARY

Therefore, an object of the disclosure is to provide an inverter device that can alleviate at least one drawback of the prior art.

According to the disclosure, the inverter device includes a converter circuit and a filter. The converter circuit has an input terminal that is adapted to be connected to a positive terminal of a power source to receive a direct current (DC) input voltage, a first output terminal, a second output terminal, and a ground terminal that is adapted to be connected to a negative terminal of the power source. The converter circuit is to further receive a first control signal, a second control signal, a third control signal, a fourth control signal, a fifth control signal and a sixth control signal, and converts, based on the first to sixth control signals, the DC input voltage into an alternating current (AC) intermediate voltage that is provided between the first and second output terminals thereof. The converter circuit includes a first converter and a second converter. Each of the first and second converters includes a first switch, a first diode, a coupled inductor circuit, a second diode, a second switch and a third switch. The first switch has a first terminal that is connected to the input terminal of the converter circuit, a second terminal, and a control terminal that is to receive a respective one of the first and second control signals. The first diode has a cathode that is connected to the second terminal of the first switch, and an anode that is connected to the ground terminal of the converter circuit. The coupled inductor circuit has a first terminal that is connected to the second terminal of the first switch, a second terminal, and a third terminal. The second diode has an anode that is connected to the third terminal of the coupled inductor circuit, and a cathode that is connected to one of the first and second output terminals of the converter circuit. The second switch has a first terminal that is connected to the second terminal of the coupled inductor circuit, a second terminal that is connected to the ground terminal of the converter circuit, and a control terminal that is to receive a respective one of the third and fourth control signals. The third switch has a first terminal that is connected to the ground terminal of the converter circuit, a second terminal that is connected to the other one of the first and second output terminals of the converter circuit, and a control terminal that is to receive a respective one of the fifth and sixth control signals. The filter is connected to the first and second output terminals of the converter circuit to receive the AC intermediate voltage, and filters the AC intermediate voltage to generate an AC output voltage.

The cathodes of the second diodes of the first and second converters are connected to different ones of the first and second output terminals of the converter circuit.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
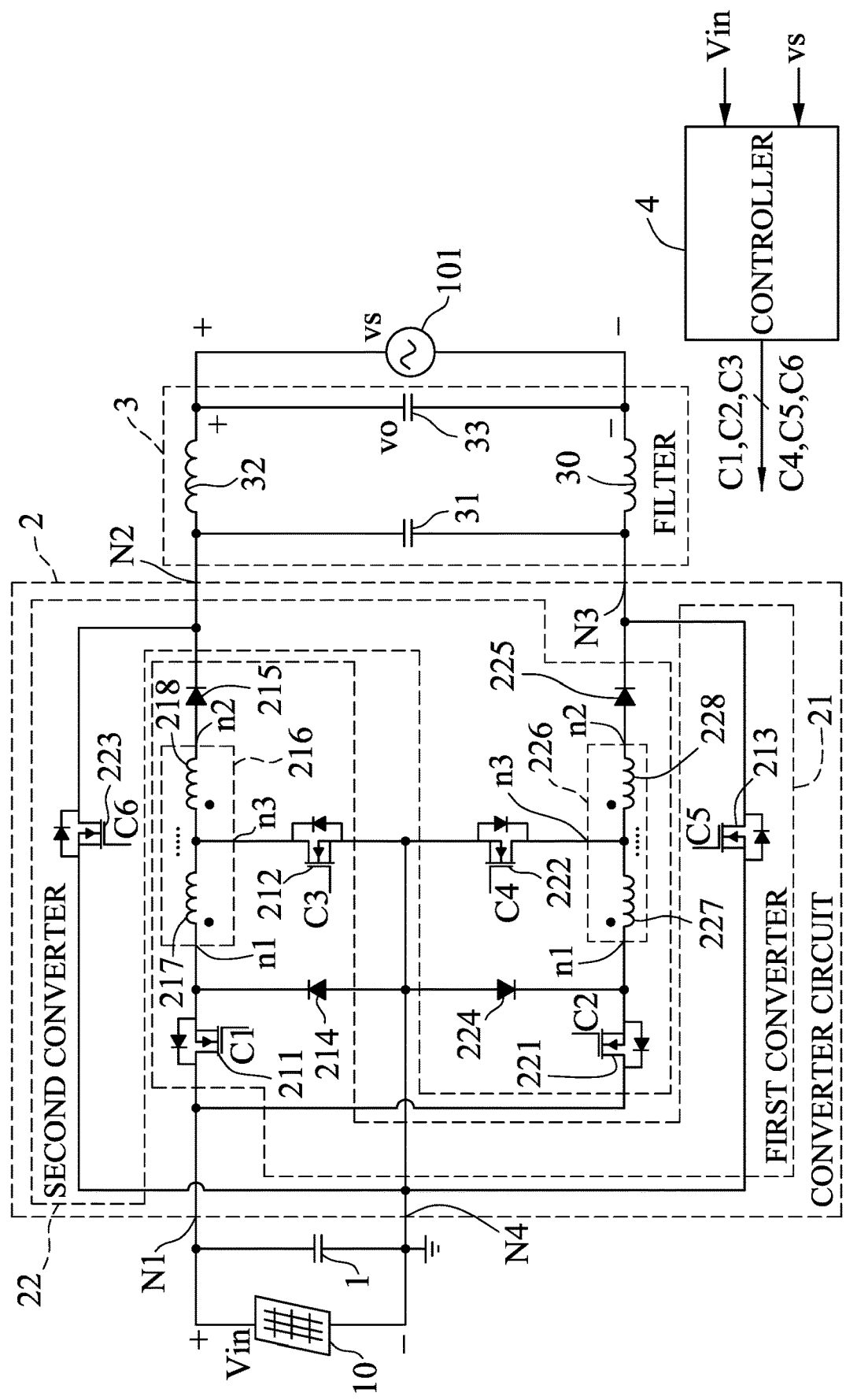
FIG. 1 is a circuit block diagram illustrating an embodiment of an inverter device according to the disclosure in use with a power source.

Referring to FIG. 1, an embodiment of an inverter device according to the disclosure is adapted to be connected to a power source 10 (e.g., a photovoltaic module) and a power grid 101, and converts direct current (DC) input power provided by the power source 10 into alternating current (AC) output power supplied to the power grid 101. The DC input power corresponds to a DC input voltage (Vin) and a DC input current. The AC output power corresponds to an AC output voltage (vo) and an AC output current. The inverter device of this embodiment can work over a wide range of DC input voltages (Vin), and includes an input capacitor 1, a converter circuit 2, a filter 3 and a controller 4.

The input capacitor 1 is adapted to be connected to the power source 10 in parallel to receive the DC input voltage (Vin), and stabilizes the DC input voltage (Vin). The input capacitor 1 has a first terminal that is adapted to be connected to a positive terminal of the power source 10, and a second terminal that is adapted to be connected to a negative terminal of the power source 10. The negative terminal of the power source 10 is connected to ground.

The converter circuit 2 has an input terminal (N1) that is connected to the first terminal of the input capacitor 1 to receive the DC input voltage (Vin), a first output terminal (N2), a second output terminal (N3), and a ground terminal (N4) that is connected to the second terminal of the input capacitor 1. The converter circuit 2 is to further receive a first control signal (C1), a second control signal (C2), a third control signal (C3), a fourth control signal (C4), a fifth control signal (C5) and a sixth control signal (C6), and converts, based on the first to sixth control signals (C1-C6), the DC input voltage (Vin) into an AC intermediate voltage that is provided between the first and second output terminals (N2, N3) thereof. The converter circuit 2 includes a first converter 21 and a second converter 22. The first converter 21 is to receive the first, third and fifth control signals (C1, C3, C5). The second converter 22 is to receive the second, fourth and sixth control signals (C2, C4, C6).

Each of the first and second converters 21, 22 is a buck-boost DC-to-DC converter, and includes a first switch 211/221, a second switch 212/222, a third switch 213/223, a first diode 214/224, a second diode 215/225 and a coupled inductor circuit 216/226. The first switch 211/221 has a first terminal that is connected to the input terminal (N1) of the converter circuit 2, a second terminal, and a control terminal that is to receive the corresponding one of the first and second control signals (C1, C2). The first diode 214/224 has a cathode that is connected to the second terminal of the first switch 211/221, and an anode that is connected to the ground terminal (N4) of the converter circuit 2. The coupled inductor circuit 216/226 has a first terminal that is connected to the second terminal of the first switch 211/221, a second terminal, and a third terminal.

In this embodiment, the coupled inductor circuit 216/226 includes a first inductor 217/227 and a second inductor 218/228 that are magnetically coupled to each other. The first inductor 217/227 has a first terminal that is connected to the first terminal of the coupled inductor circuit 216/226, and a second terminal that is connected to the second terminal of the coupled inductor circuit 216/226. The second inductor 218/228 has a first terminal that is connected to the second terminal of the coupled inductor circuit 216/226, and a second terminal that is connected to the third terminal of the coupled inductor circuit 216/226. The first terminals of the first and second inductors 217/227, 218/228 have the same voltage polarity. The second diode 215/225 has an anode that is connected to the third terminal of the coupled inductor circuit 216/226, and a cathode that is connected to one of the first and second output terminals (N2, N3) of the converter circuit 2. The second switch 212/222 has a first terminal that is connected to the second terminal of the coupled inductor circuit 216/226, a second terminal that is connected to the ground terminal (N4) of the converter circuit 2, and a control terminal that is to receive the corresponding one of the third and fourth control signals (C3, C4). The third switch 213/223 has a first terminal that is connected to the ground terminal (N4) of the converter circuit 2, a second terminal that is connected to the other one of the first and second output terminals (N2, N3) of the converter circuit 2, and a control terminal that is to receive the corresponding of the fifth and sixth control signals (C5, C6).

The cathodes of the second diodes 215, 225 of the first and second converters 21, 22 are connected to different ones of the first and second output terminals (N2, N3) of the converter circuit 2.

In this embodiment, each of the first to third switches 211-213, 221-223 of the first and second converters 21, 22 is an N-type metal oxide semiconductor field effect transistor (nMOSFET). The first, second and control terminals of each of the first and second switches 211, 212, 221, 222 of the first and second converters 21, 22 are respectively a drain terminal, a source terminal and a gate terminal. The first, second and control terminals of each of the third switches 213, 223 of the first and second converters 21, 22 are respectively a source terminal, a drain terminal and a gate terminal.

The filter 3 is connected to the first and second output terminals (N2, N3) of the converter circuit 2 to receive the AC intermediate voltage, is adapted to be further connected to the power grid 101, and filters the AC intermediate voltage to generate the AC output voltage (vo) for receipt by the power grid 101.

In this embodiment, the filter 3 includes a filtering capacitor 31, a first filtering inductor 32, a second filtering inductor 30 and an output capacitor 33. The filtering capacitor 31 has a first terminal and a second terminal that are respectively connected to the first and second output terminals (N2, N3) of the converter circuit 2 to cooperatively receive the AC intermediate voltage. The first filtering inductor 32 has a first terminal that is connected to the first terminal of the filtering capacitor 31, and a second terminal that is adapted to be connected to a first terminal of the power grid 101. The second filtering inductor 30 has a first terminal that is connected to the second terminal of the filtering capacitor 31, and a second terminal that is adapted to be connected to a second terminal of the power grid 101. The output capacitor 33 is connected between the second terminals of the first and second filtering inductors 32, 30, and a voltage across the output capacitor 33 serves as the AC output voltage (vo).

The controller 4 is connected to the input capacitor 1 to receive the DC input voltage (Vin), is adapted to be further connected to the power grid 101 to receive an AC grid voltage (vs) provided by the power grid 101, and is further connected to the control terminals of the first to third switches 211-213, 221-223 of the first and second converters 21, 22. Based on the DC input voltage (Vin) and the AC grid voltage (vs), the controller 4 generates the first to sixth control signals (C1-C6) for receipt by the control terminals of the first to third switches 211-213, 221-223 of the first and second converters 21, 22. In this embodiment, the controller 4 performs pulse width modulation to generate the first to fourth control signals (C1-C4).

Figure 2:
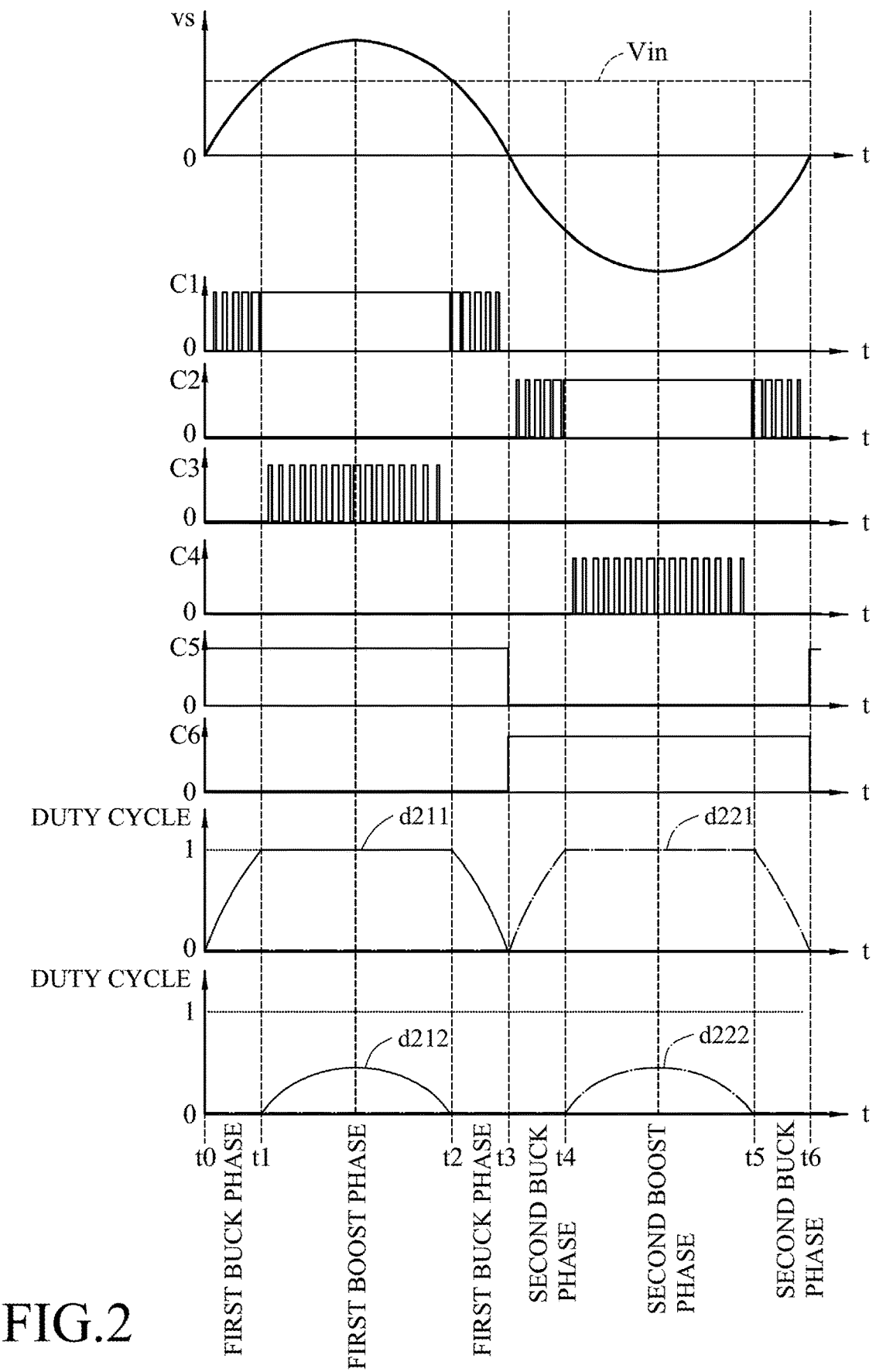
FIG. 2 is a timing diagram illustrating operations of the embodiment.

FIGS. 2 to 10 illustrate operations of the inverter device of this embodiment. In FIG. 2, the AC grid voltage (vs), the first to sixth control signals (C1-C6), a duty cycle (d211) of the first switch 211, a duty cycle (d221) of the first switch 221, a duty cycle (d212) of the second switch 212 and a duty cycle (d222) of the second switch 222 are depicted. In FIGS. 3 to 10, the controller 4 (see FIG. 1) is not depicted, conducting elements are depicted by solid lines, non-conducting elements are depicted by dashed lines, and current flow is shown by dashed arrows.

In this embodiment, as shown in FIG. 2, the fifth and sixth control signals (C5, C6) are complementary to each other. In addition, the filter 3 is a low-pass filter, so the AC output voltage (vo) is substantially sinusoidal and is similar to the AC grid voltage (vs). The AC output current is also substantially sinusoidal, and is in-phase with the AC output voltage (vo) and the AC grid voltage (vs).

In this embodiment, as shown in FIG. 2, the inverter device sequentially operates in a first buck phase, a first boost phase, the first buck phase, a second buck phase, a second boost phase and the second buck phase during each cycle of the AC grid voltage (vs). In a positive half cycle of the AC grid voltage (vs) from time t0 to time t3, the inverter device first operates in the first buck phase, enters the first boost phase when the AC grid voltage (vs) increases to becoming greater than the DC input voltage (Vin) at time t1, and enters the first buck phase again when the AC grid voltage (vs) decreases to becoming smaller than the DC input voltage (Vin) at time t2. In a negative half cycle of the AC grid voltage (vs) from time t3 to time t6, the inverter device first operates in the second buck phase, enters the second boost phase when an absolute value of the AC grid voltage (vs) increases to becoming greater than the DC input voltage (Vin) at time t4, and enters the second buck phase again when the absolute value of the AC grid voltage (vs) decreases to becoming smaller than the DC input voltage (Vin) at time t5.

Figure 3:
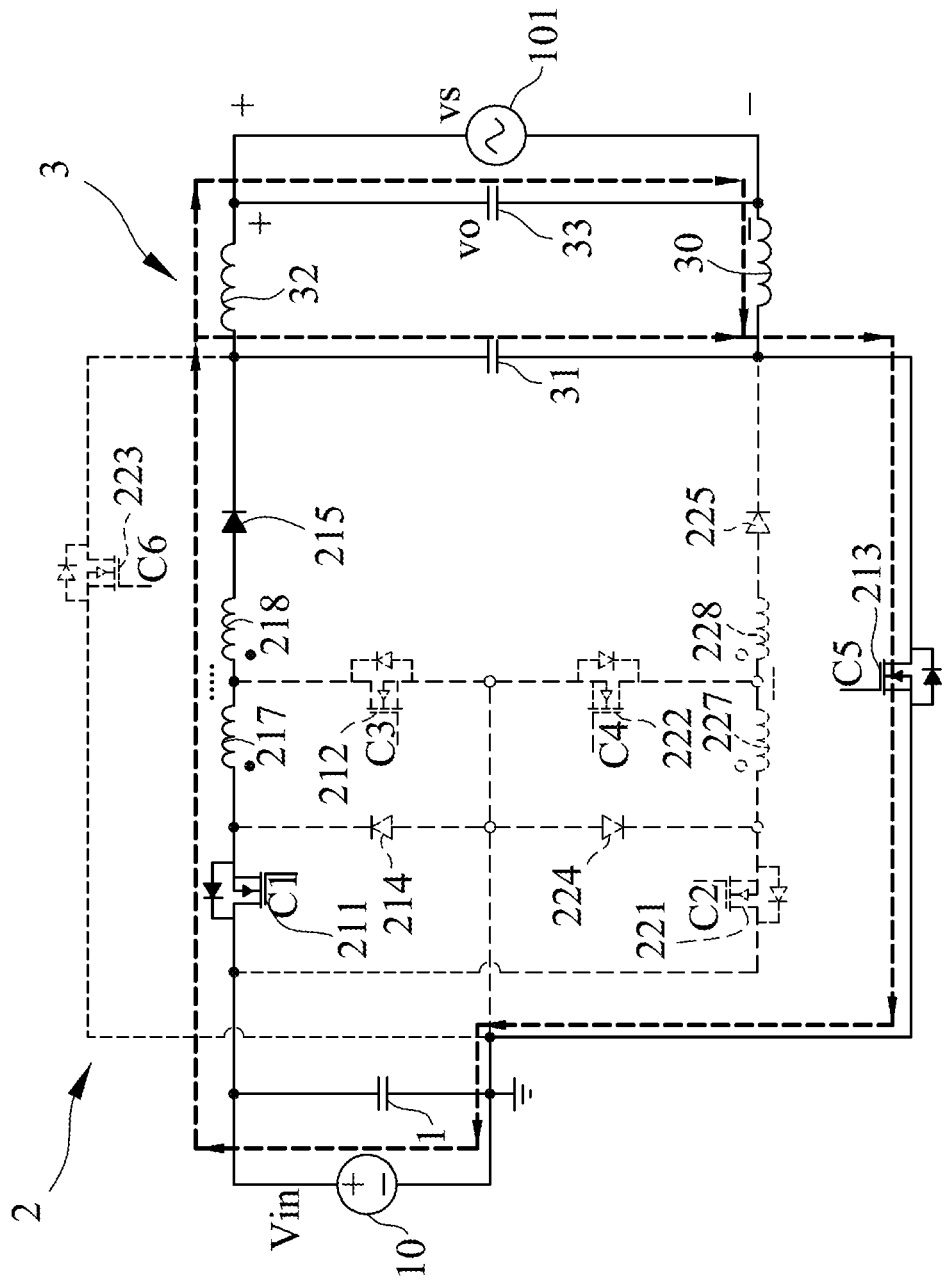
FIGS. 3 and 4 are equivalent circuit diagrams illustrating the embodiment operating in a first buck phase.
Figure 4:
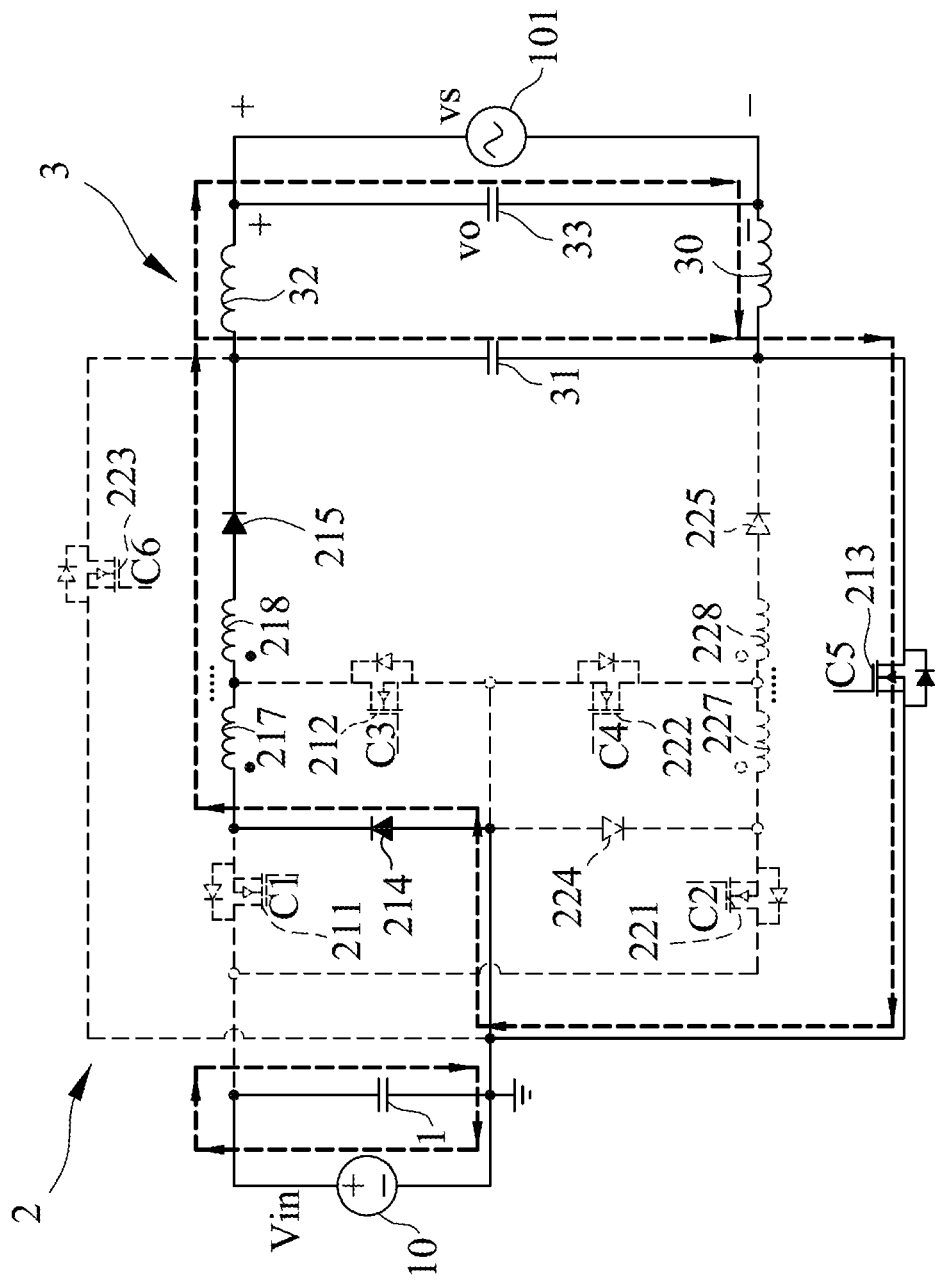

As shown in FIGS. 2, 3 and 4, in the first buck phase, the first control signal (C1) transitions between a logic high state and a logic low state with the logic high state reoccurring at a high frequency (e.g., 20 KHz), the fifth control signal (C5) stays in the logic high state, and the second to fourth and sixth control signals (C2-C4, C6) stay in the logic low state, so the first switch 211 transitions between conduction and non-conduction with conduction reoccurring at the high frequency, the third switch 213 remains conducting, and the second switch 212 and the first to third switches 221-223 remain non-conducting. At this time, the first diode 214 does not conduct when the first switch 211 conducts, and conducts when the first switch 211 does not conduct, the second diode 215 remains conducting, and the first and second diodes 224, 225 remain non-conducting. As shown in FIG. 3, when the first switch 211 conducts, the first and second inductors 217, 218 are connected in series and are charged by the power source 10 to store power, and there is power transmission from the power source 10 to the filter 3 and the power grid 101. As shown in FIG. 4, when the first switch 211 does not conduct, the first and second inductors 217, 218 are connected in series, and the power stored in the first and second inductors 217, 218 is released to the filter 3 and the power grid 101.

Figure 5:
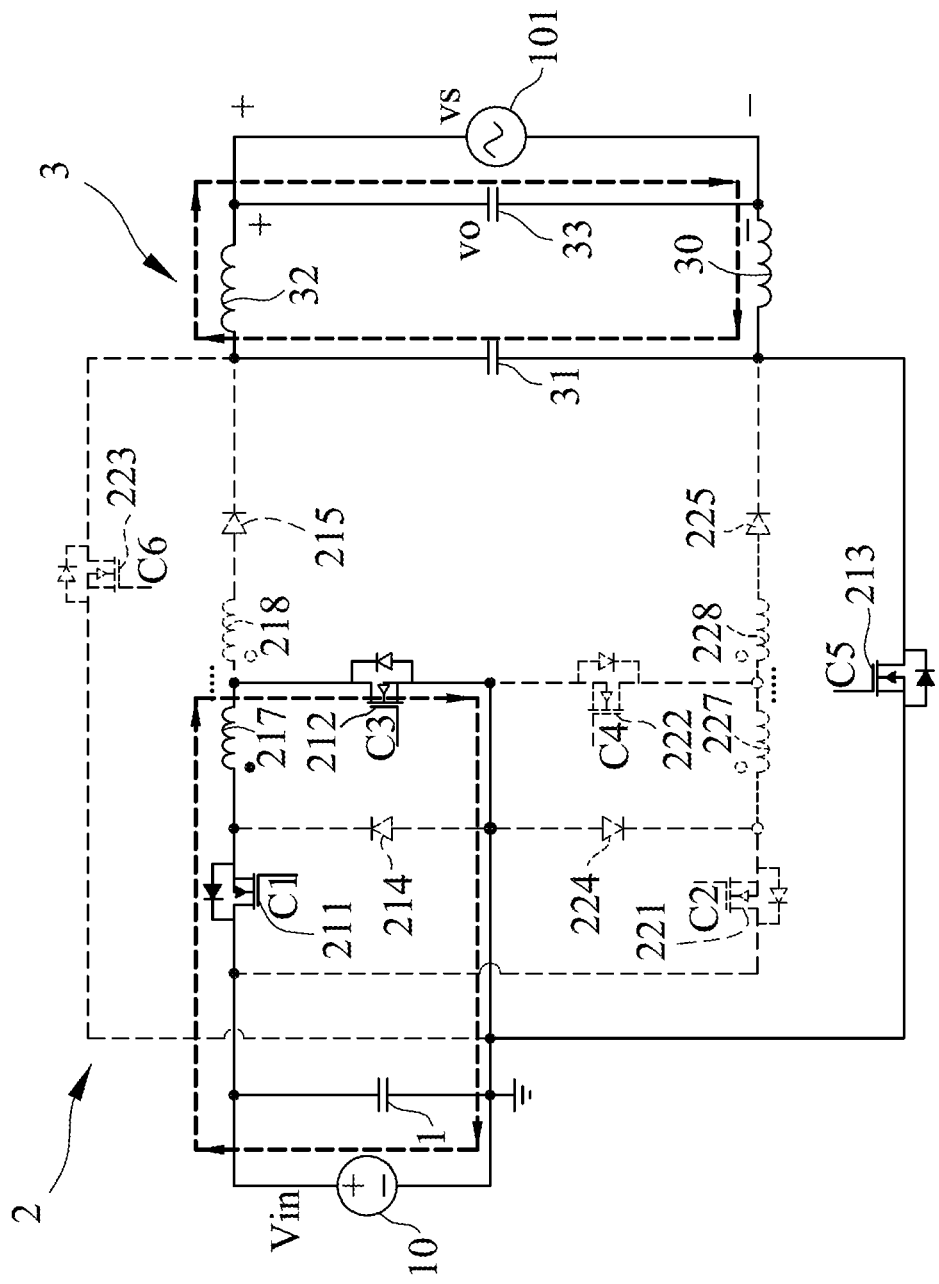
FIGS. 5 and 6 are equivalent circuit diagrams illustrating the embodiment operating in a first boost phase.
Figure 6:
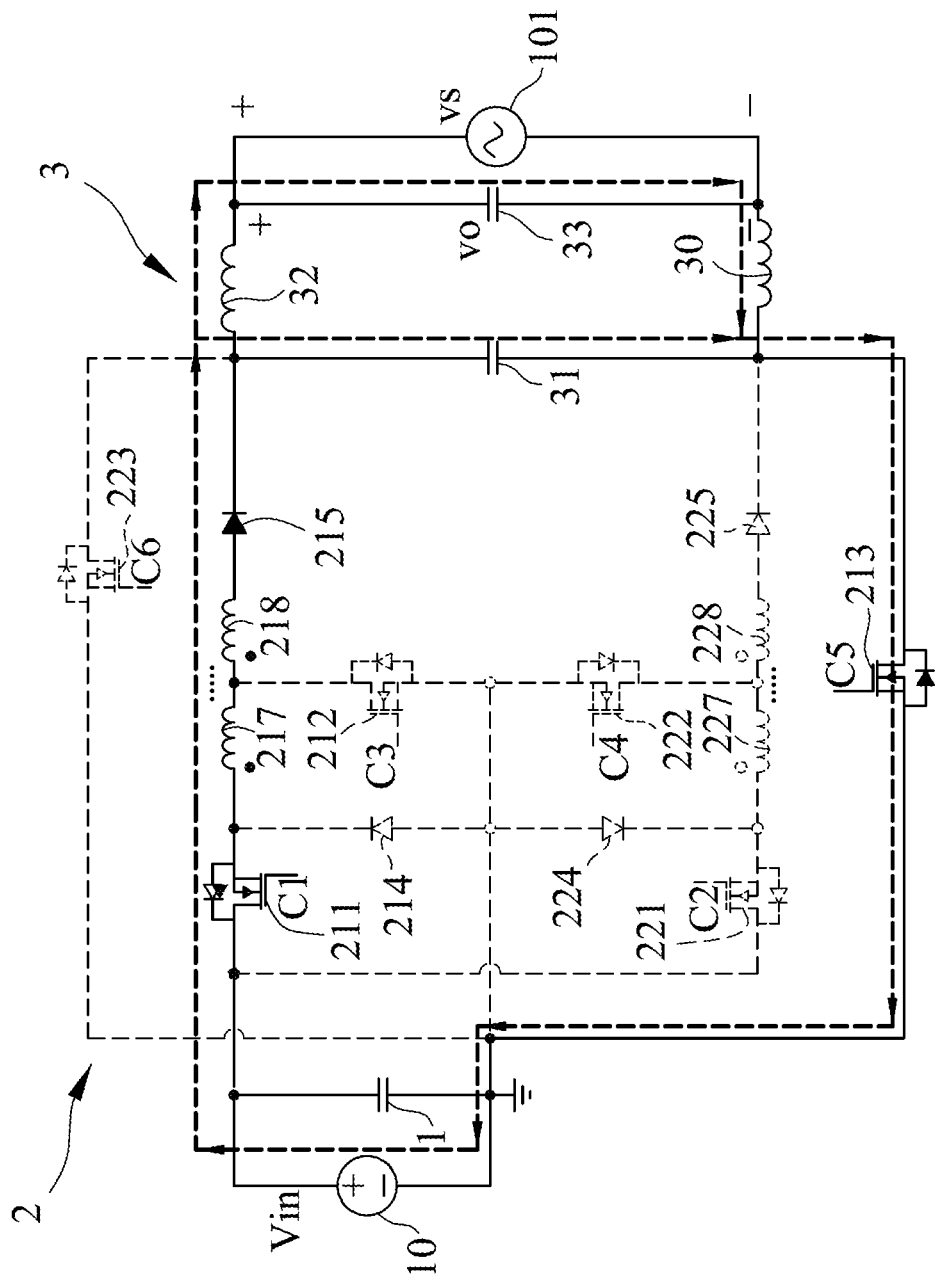

As shown in FIGS. 2, 5 and 6, in the first boost phase, the third control signal (C3) transitions between the logic high state and the logic low state with the logic high state reoccurring at the high frequency, the first and fifth control signals (C1, C5) stay in the logic high state, and the second, fourth and sixth control signals (C2, C4, C6) stay in the logic low state, so the second switch 212 transitions between conduction and non-conduction with conduction reoccurring at the high frequency, the first and third switches 211, 213 remain conducting, and the first to third switches 221-223 remain non-conducting. At this time, the second diode 215 does not conduct when the second switch 212 conducts, and conducts when the second switch 212 does not conduct, and the first diode 214 and the first and second diodes 224, 225 remain non-conducting. As shown in FIG. 5, when the second switch 212 conducts, only the first inductor 217 is charged by the power source 10 to store power, and the power stored in the filter 3 is released to the power grid 101. As shown in FIG. 6, when the second switch 212 does not conduct, the first and second inductors 217, 218 are connected in series, the power stored in the first inductor 217 is released to the filter 3 and the power grid 101, and there is power transmission from the power source 10 to the filter 3 and the power grid 101.

It should be noted that, in both of the first buck phase and the first boost phase, the third switch 213 remains conducting to cause the negative terminal of the power source 10 to be constantly connected to the second terminal of the power grid 101, so parasitic capacitances existing between the power source 10 and ground would not generate any current under the influence of any high frequency voltage, thereby reducing a leakage current of the power source 10.

Figure 7:
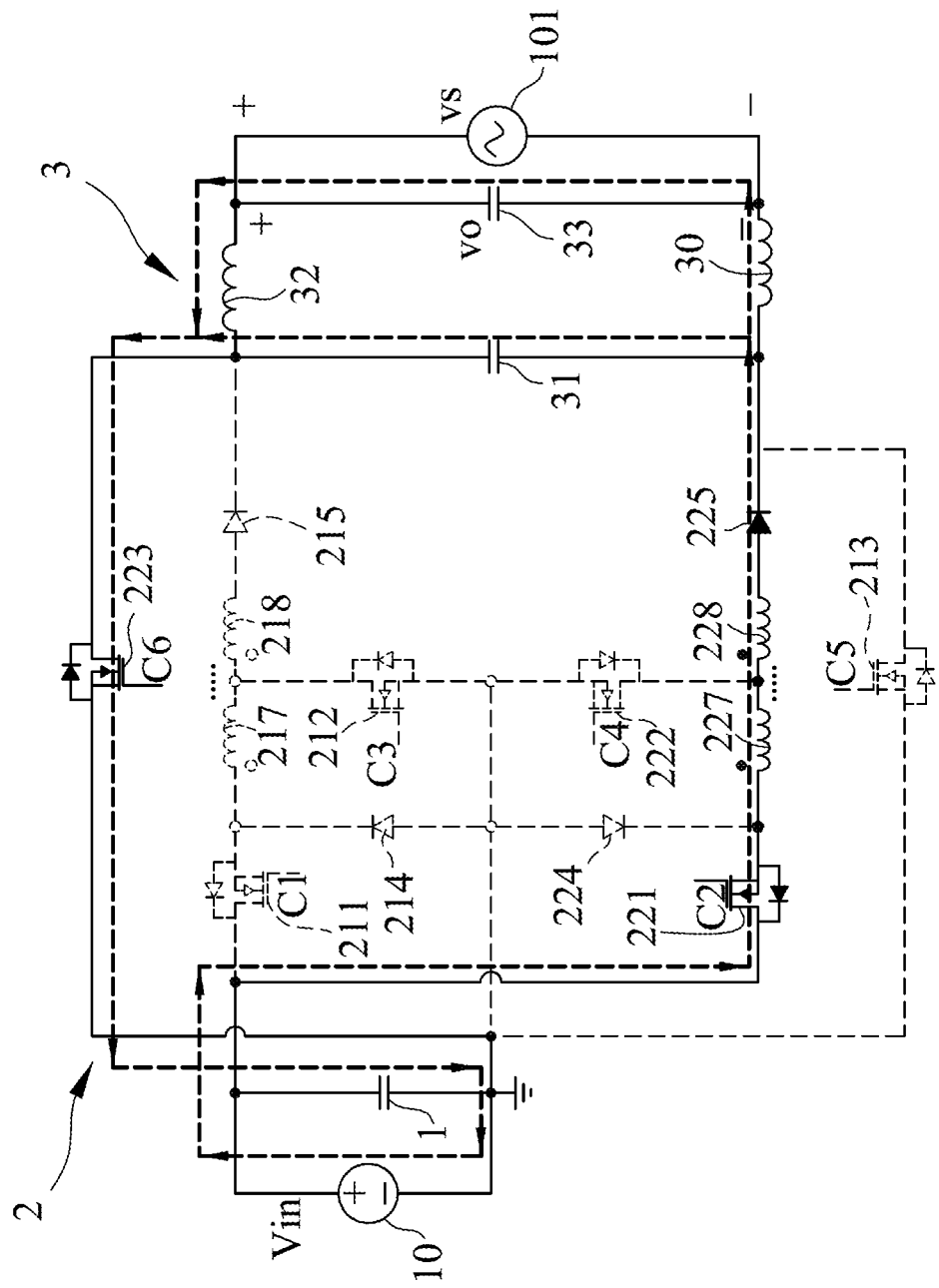
FIGS. 7 and 8 are equivalent circuit diagrams illustrating the embodiment operating in a second buck phase.
Figure 8:
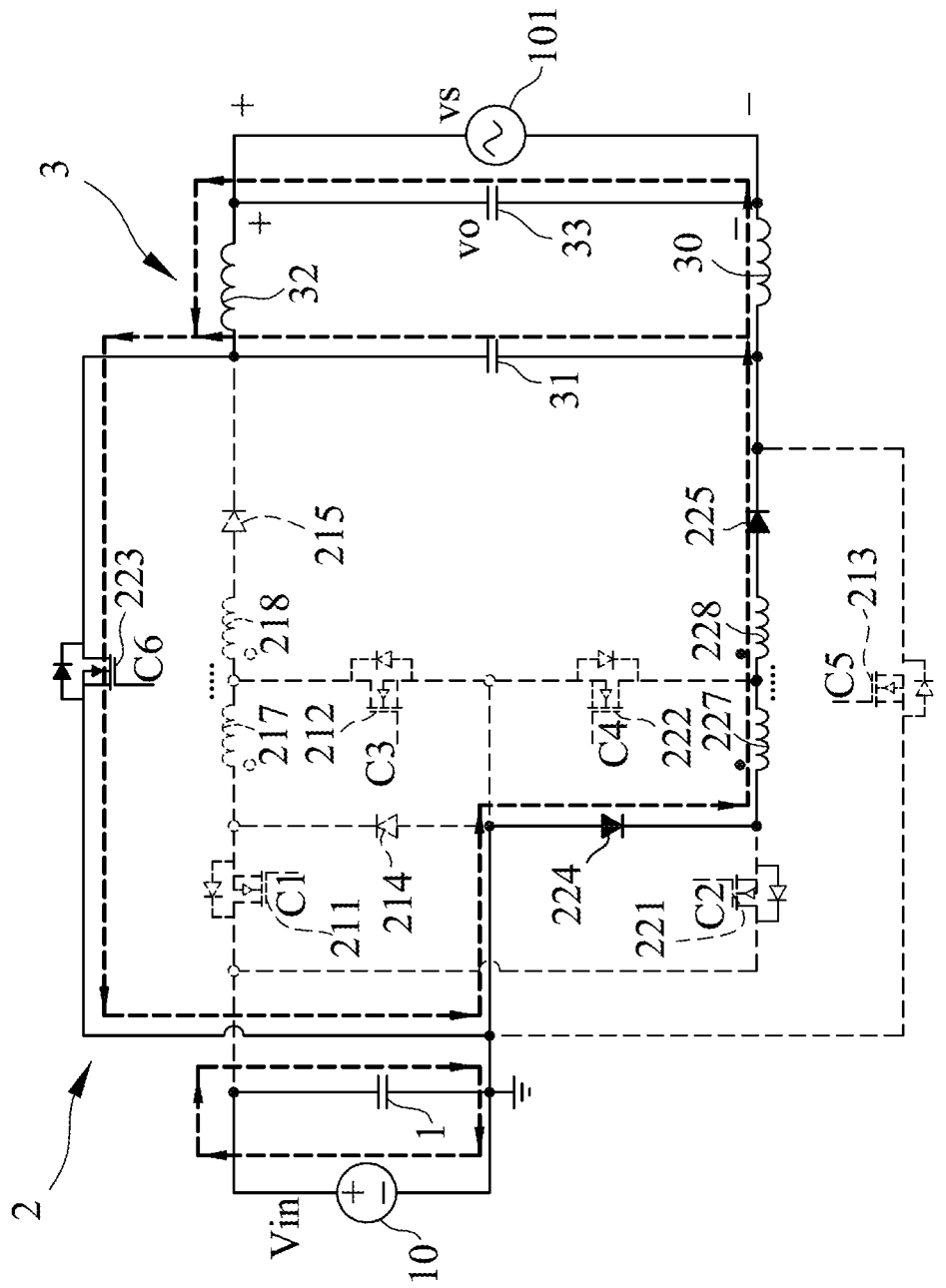

As shown in FIGS. 2, 7 and 8, in the second buck phase, the second control signal (C2) transitions between the logic high state and the logic low state with the logic high state reoccurring at the high frequency, the sixth control signal (C6) stays in the logic high state, and the first and third to fifth control signals (C1, C3-C5) stay in the logic low state, so the first switch 221 transitions between conduction and non-conduction with conduction reoccurring at the high frequency, the third switch 223 remains conducting, and the second switch 222 and the first to third switches 211-213 remain non-conducting. At this time, the first diode 224 does not conduct when the first switch 221 conducts, and conducts when the first switch 221 does not conduct, the second diode 225 remains conducting, and the first and second diodes 214, 215 remain non-conducting. As shown in FIG. 7, when the first switch 221 conducts, the first and second inductors 227, 228 are connected in series and are charged by the power source 10 to store power, and there is power transmission from the power source 10 to the filter 3 and the power grid 101. As shown in FIG. 8, when the first switch 221 does not conduct, the first and second inductors 227, 228 are connected in series, and the power stored in the first and second inductors 227, 228 is released to the filter 3 and the power grid 101.

Figure 9:
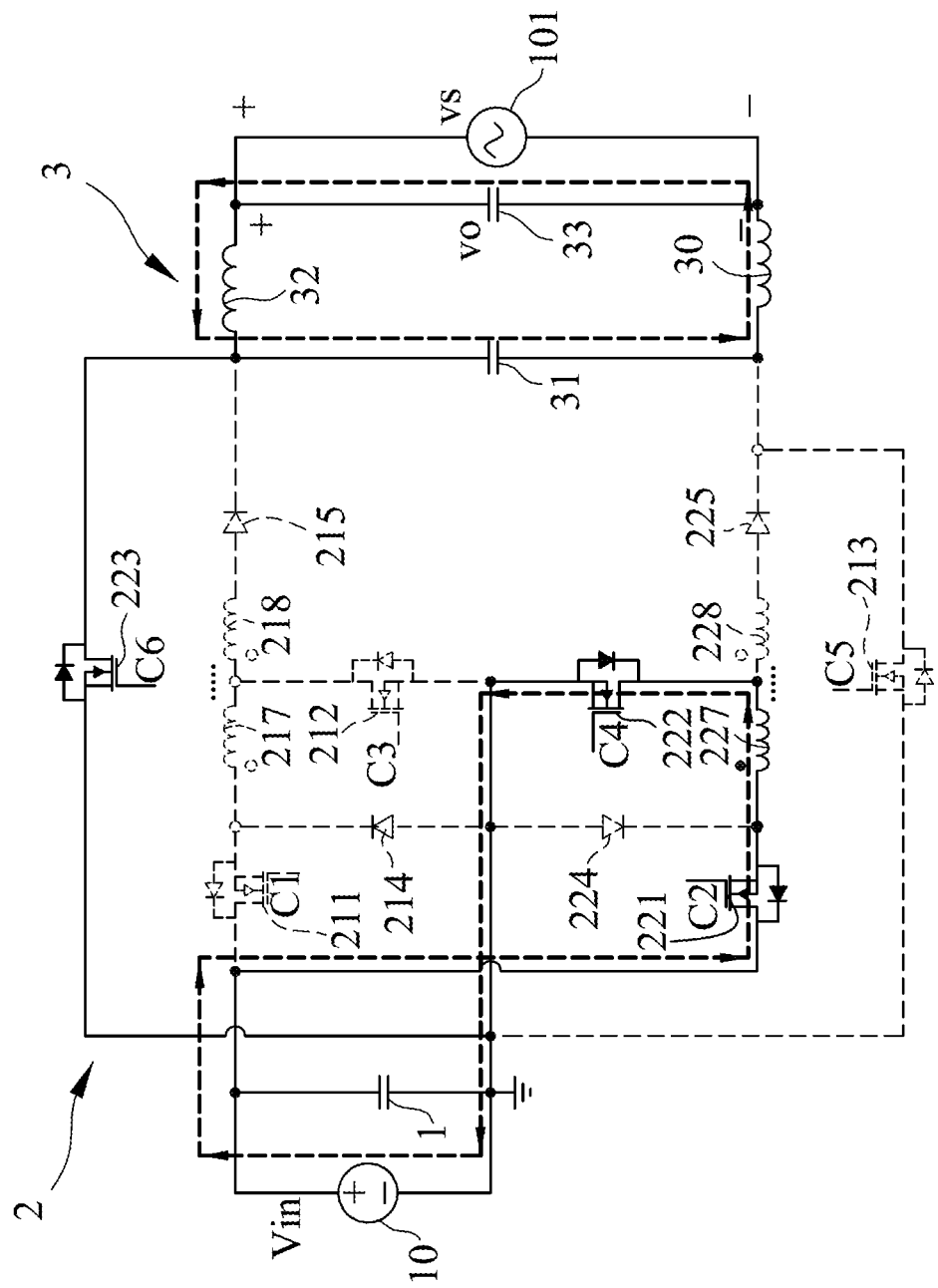
FIGS. 9 and 10 are equivalent circuit diagrams illustrating the embodiment operating in a second boost phase.
Figure 10:
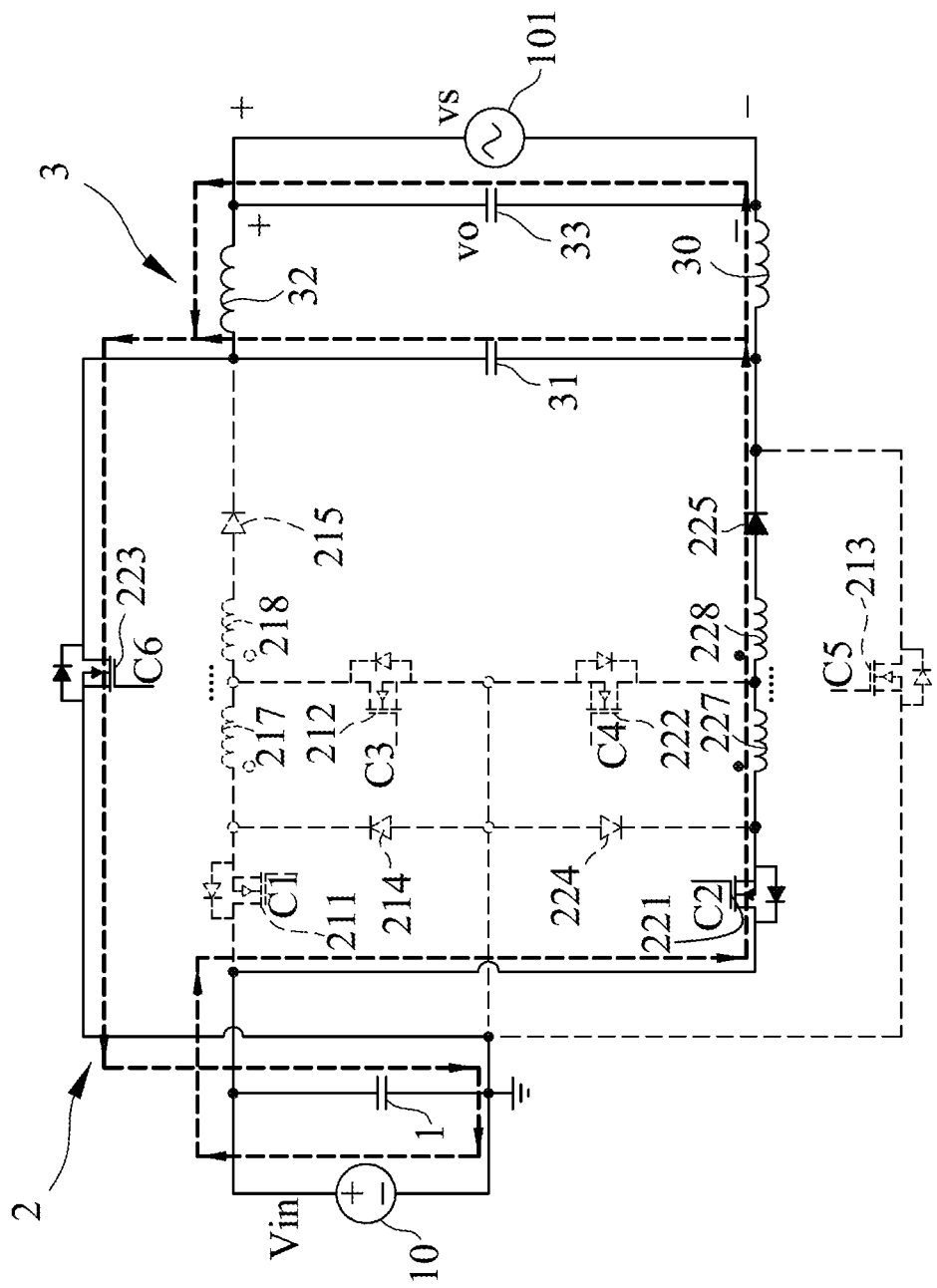

As shown in FIGS. 2, 9 and 10, in the second boost phase, the fourth control signal (C4) transitions between the logic high state and the logic low state with the logic high state reoccurring at the high frequency, the second and sixth control signals (C2, C6) stay in the logic high state, and the first, third and fifth control signals (C1, C3, C5) stay in the logic low state, so the second switch 222 transitions between conduction and non-conduction with conduction reoccurring at the high frequency, the first and third switches 221, 223 remain conducting, and the first to third switches 211-213 remain non-conducting. At this time, the second diode 225 does not conduct when the second switch 222 conducts, and conducts when the second switch 222 does not conduct, and the first diode 224 and the first and second diodes 214, 215 remain non-conducting. As shown in FIG. 9, when the second switch 222 conducts, only the first inductor 227 is charged by the power source 10 to store power, and the power stored in the filter 3 is released to the power grid 101. As shown in FIG. 10, when the second switch 222 does not conduct, the first and second inductors 227, 228 are connected in series, the power stored in the first inductor 227 is released to the filter 3 and the power grid 101, and there is power transmission from the power source 10 to the filter 3 and the power grid 101.

It should be noted that, in both of the second buck phase and the second boost phase, the third switch 223 remains conducting to cause the negative terminal of the power source 10 to be constantly connected to the first terminal of the power grid 101, so the parasitic capacitances existing between the power source 10 and ground would not generate any current under the influence of any high frequency voltage, thereby reducing the leakage current of the power source 10.

It should also be noted that, in any one of the first and second buck phases and the first and second boost phases, only one switch (i.e., one of the switches 211, 212, 221, 222) and only one diode (i.e., one of the diodes 214, 215, 224, 225) operate at the high frequency (i.e., the inverter device of this embodiment performs single-stage power conversion), resulting in low switching loss and high power conversion efficiency of the inverter device of this embodiment. In addition, only one switch (i.e., one of the switches 213, 223) and only one diode (i.e., one of the diodes 215, 225) conduct continuously in any one of the first and second buck phases, and only two switches (i.e., the switches 211, 213 or the switches 221, 223) conduct continuously in any one of the first and second boost phases, resulting in low conduction loss of the inverter device of this embodiment.

Figure 11:
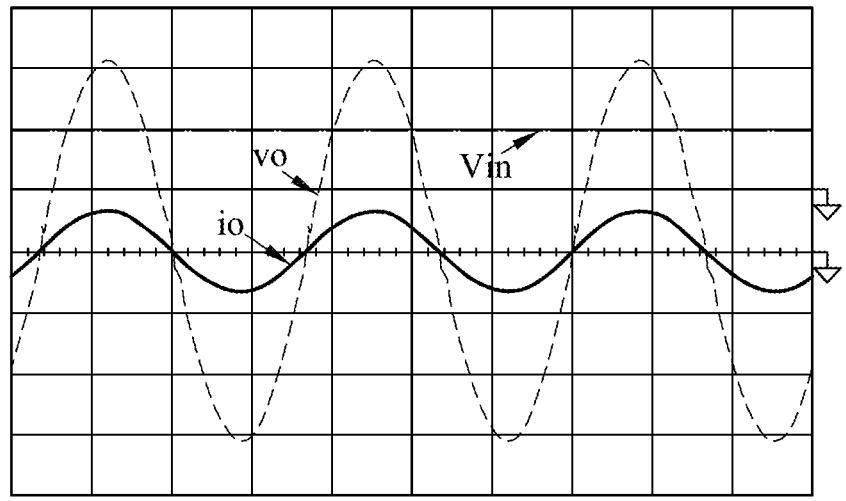
FIG. 11 is a timing diagram illustrating an alternating current (AC) output voltage and an AC output current of the embodiment when a direct current (DC) input voltage and an output power of the embodiment are respectively 100 V and 500 W.
Figure 12:
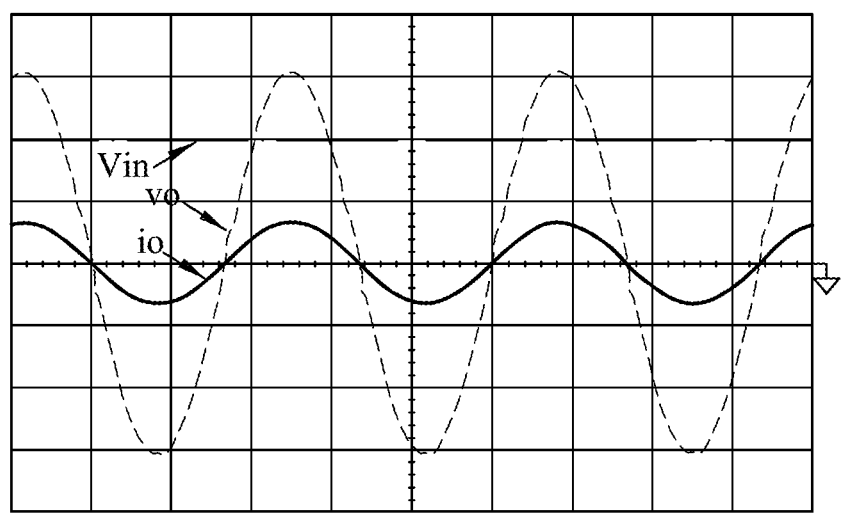
FIG. 12 is a timing diagram illustrating the AC output voltage and the AC output current when the DC input voltage and the output power are respectively 200 V and 500 W.

Referring to FIGS. 1, 11 and 12, FIG. 11 illustrates the AC output voltage (vo) and the AC output current (io) in a scenario where output power of the inverter device of the embodiment is 500 W, the DC input voltage (Vin) is 100 V, and the AC grid voltage (vs) is 220 Vrms. FIG. 12 illustrates the AC output voltage (vo) and the AC output current (io) in a scenario where the output power of the inverter device of the embodiment is 500 W, the DC input voltage (Vin) is 200 V, and the AC grid voltage (vs) is 220 Vrms. In FIGS. 11 and 12, the vertical scale is 100 V/div for the AC output voltage (vo) and is 5 A/div for the AC output current (io), and the horizontal scale is 5 ms/div. It can be reasonably determined from FIGS. 11 and 12 that each of the AC output voltage (vo) and the AC output current (io) has low distortion and approximates to an ideal sine wave regardless of whether the DC input voltage (Vin) is 100 V or 200 V, and that the inverter device of this embodiment can perform DC to AC conversion over a wide range of DC input voltages (Vin).

Figure 13:
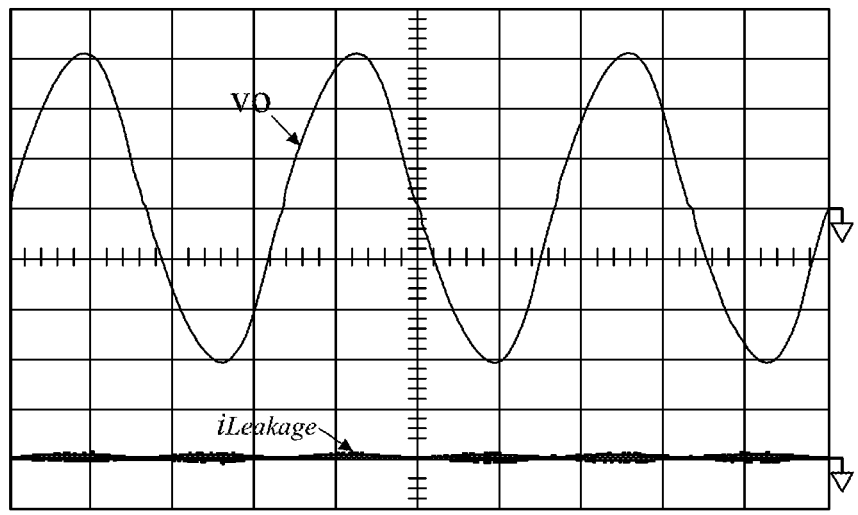
FIG. 13 is a timing diagram illustrating the AC output voltage and a leakage current of the power source when the DC input voltage and the output power are respectively 100 V and 500 W.
Figure 14:
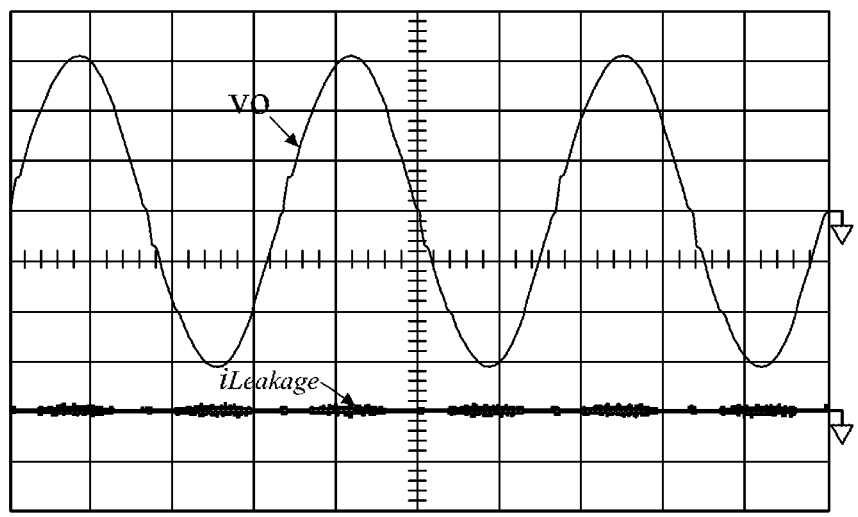
FIG. 14 is a timing diagram illustrating the AC output voltage and the leakage current when the DC input voltage and the output power are respectively 200 V and 500 W.

Referring to FIGS. 1, 13 and 14, FIG. 13 illustrates the AC output voltage (vo) and the leakage current ($i_{Leakage}$) of the power source 10 in the scenario where the output power of the inverter device of the embodiment is 500 W, the DC input voltage (Vin) is 100 V, and the AC grid voltage (vs) is 220 Vrms. FIG. 14 illustrates the AC output voltage (vo) and the leakage current ($i_{Leakage}$) in the scenario where the output power of the inverter device of the embodiment is 500 W, the DC input voltage (Vin) is 200 V, and the AC grid voltage (vs) is 220 Vrms. In FIGS. 13 and 14, the vertical scale is 100 V/div for the AC output voltage (vo) and is 100 mA/div for the leakage current ($i_{Leakage}$), and the horizontal scale is 5 ms/div. It can be reasonably determined from FIGS. 13 and 14 that the inverter device of this embodiment can effectively reduce the leakage current ($i_{Leakage}$).

Figure 15:
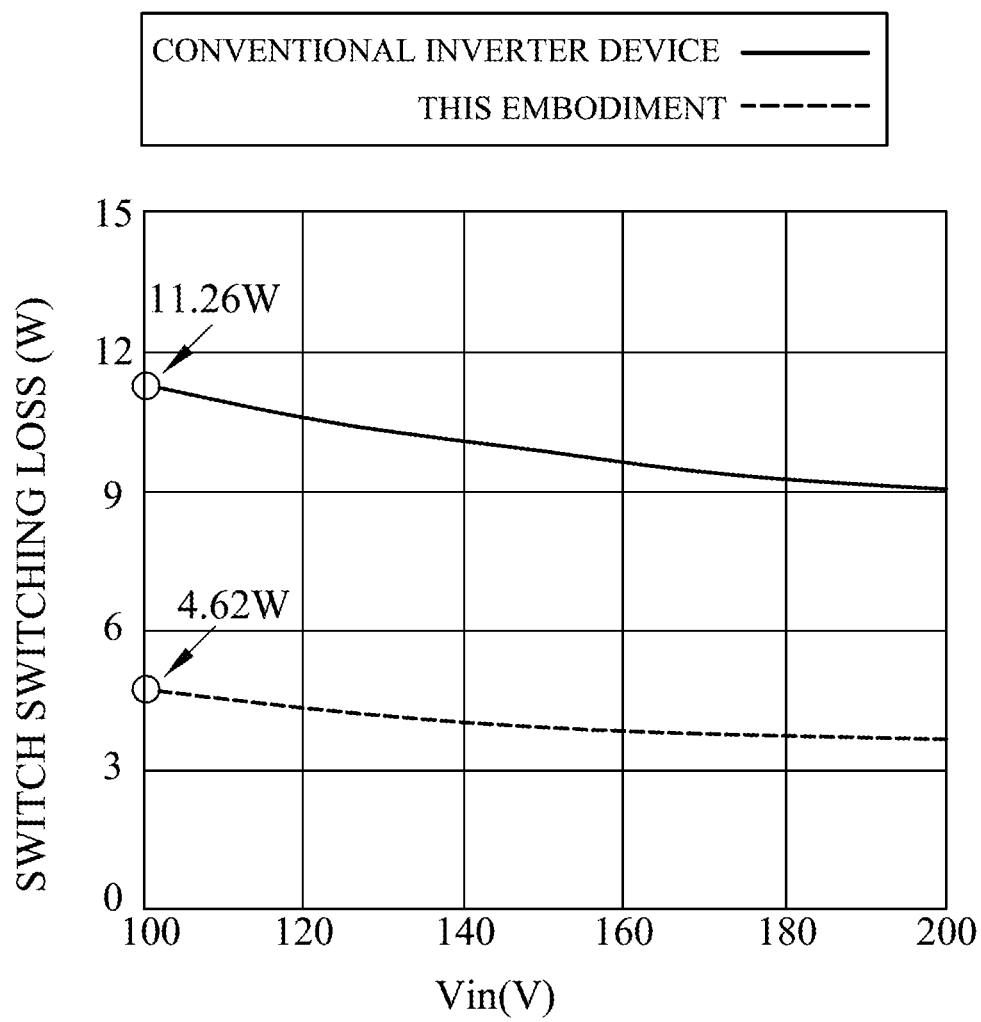
FIG. 15 is a plot illustrating switch switching loss versus DC input voltage characteristic for the embodiment and the conventional inverter device.

Referring to FIGS. 1 and 15, FIG. 15 illustrates switch switching loss (i.e., switching loss of all switches) versus DC input voltage (Vin) characteristic for the inverter device of this embodiment and the conventional inverter device in a scenario where the output power of the inverter device of this embodiment is 500 W, the AC grid voltage (vs) is 220 Vrms, and the DC input voltage (Vin) falls within a range of from 100 V to 200 V. It can be reasonably determined from FIG. 15 that, as compared to the conventional inverter device, the inverter device of this embodiment has lower switch switching loss.

Referring back to FIG. 1, in view of the above, the inverter device of this embodiment has the following advantages.

1. In any one of the first and second boost phases, only the first inductor 217/227 is charged to store power when the second switch 212/222 conducts, and the first inductor 217/227 and the second inductor 218/228 are connected in series when the second switch 212/222 does not conduct to assist in releasing the power stored in the first inductor 217/227 and transmitting the power from the power source 10, thereby resulting in a high voltage gain and thus a high boost ratio of the inverter device. Therefore, the inverter device can work over a wide range of DC input voltages (Vin).
2. In any one of the first and second buck phases and the first and second boost phases, only one switch (i.e., one of the switches 211, 212, 221, 222) and only one diode (i.e., one of the diodes 214, 215, 224, 225) operate at the high frequency (i.e., the inverter device performs single-stage power conversion), thereby resulting in low switching loss and high power conversion efficiency of the inverter device.
3. In any one of the first and second buck phases and the first and second boost phases, one of the third switches 213, 223 remains conducting to cause the negative terminal of the power source 10 to be constantly connected to the power grid 101, so the leakage current of the power source 10 can be reduced to alleviate electromagnetic interference.

In the description above, for the purposes of explanation, numerous specific details have been set forth in order to provide a thorough understanding of the embodiment. It will be apparent, however, to one skilled in the art, that one or more other embodiments maybe practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that the disclosure is not limited to the disclosed embodiment but is intended to cover various arrangements included within the spirit and scope of the broadest interpretation so as to encompass all such modifications and equivalent arrangements.

What is claimed is:

1. An inverter device comprising:
a converter circuit having an input terminal that is adapted to be connected to a positive terminal of a power source to receive a direct current (DC) input voltage, a first output terminal, a second output terminal, and a ground terminal that is adapted to be connected to a negative terminal of the power source, said converter circuit being to further receive a first control signal, a second control signal, a third control signal, a fourth control signal, a fifth control signal and a sixth control signal, and converting, based on the first to sixth control signals, the DC input voltage into an alternating current (AC) intermediate voltage that is provided between said first and second output terminals thereof, said converter circuit including a first converter and a second converter, each of said first and second converters including
a first switch having a first terminal that is connected to said input terminal of said converter circuit, a second terminal, and a control terminal that is to receive a respective one of the first and second control signals,
a first diode having a cathode that is connected to said second terminal of said first switch, and an anode that is connected to said ground terminal of said converter circuit,
a coupled inductor circuit having a first terminal that is connected to said second terminal of said first switch, a second terminal, and a third terminal,
a second diode having an anode that is connected to said third terminal of said coupled inductor circuit, and a cathode that is connected to one of said first and second output terminals of said converter circuit,
a second switch having a first terminal that is connected to said second terminal of said coupled inductor circuit, a second terminal that is connected to said ground terminal of said converter circuit, and a control terminal that is to receive a respective one of the third and fourth control signals, and
a third switch having a first terminal that is connected to said ground terminal of said converter circuit, a second terminal that is connected to the other one of said first and second output terminals of said converter circuit, and a control terminal that is to receive a respective one of the fifth and sixth control signals; and
a filter connected to said first and second output terminals of said converter circuit to receive the AC intermediate voltage, and filtering the AC intermediate voltage to generate an AC output voltage;
wherein the cathodes of said second diodes of said first and second converters are connected to different ones of said first and second output terminals of said converter circuit.

2. The inverter device of claim 1, wherein, for each of said first and second converters, said coupled inductor circuit includes:
a first inductor having a first terminal that is connected to said first terminal of said coupled inductor circuit, and a second terminal that is connected to said second terminal of said coupled inductor circuit; and
a second inductor having a first terminal that is connected to said second terminal of said coupled inductor circuit, and a second terminal that is connected to said third terminal of said coupled inductor circuit, said second inductor being magnetically coupled to said first inductor;
said first terminals of said first and second inductors having a same voltage polarity.

3. The inverter device of claim 1, wherein:
said inverter device operates in a plurality of phases that include a first buck phase and a second buck phase;
in the first buck phase, the first to sixth control signals are configured in such a way that said first switch of said first converter transitions between conduction and non-conduction, said third switch of said first converter remains conducting, and said second switch of said first converter and said first to third switches of said second converter remain non-conducting; and
in the second buck phase, the first to sixth control signals are configured in such a way that said first switch of said second converter transitions between conduction and non-conduction, said third switch of said second converter remains conducting, and said second switch of said second converter and said first to third switches of said first converter remain non-conducting.

4. The inverter device of claim 1, wherein:
said inverter device operates in a plurality of phases that include a first boost phase and a second boost phase;
in the first boost phase, the first to sixth control signals are configured in such a way that said second switch of said first converter transitions between conduction and non-conduction, said first and third switches of said first converter remain conducting, and said first to third switches of said second converter remain non-conducting; and
in the second boost phase, the first to sixth control signals are configured in such a way that said second switch of said second converter transitions between conduction and non-conduction, said first and third switches of said second converter remain conducting, and said first to third switches of said first converter remain non-conducting.

5. The inverter device of claim 1, wherein said filter includes:
a filtering capacitor having a first terminal and a second terminal that are respectively connected to said first and second output terminals of said converter circuit to cooperatively receive the AC intermediate voltage;
a first filtering inductor having a first terminal that is connected to said first terminal of said filtering capacitor, and a second terminal;
a second filtering inductor having a first terminal that is connected to said second terminal of said filtering capacitor, and a second terminal; and
an output capacitor connected between said second terminals of said first and second filtering inductors;
a voltage across said output capacitor serving as the AC output voltage.

6. The inverter device of claim 1, further comprising:
a controller adapted to be connected to the power source to receive the DC input voltage, to further receive an AC grid voltage, and further connected to said control terminals of said first to third switches of said first and second converters;
based on the DC input voltage and the AC grid voltage, said controller generating the first to sixth control signals for receipt by said control terminals of said first to third switches of said first and second converters.

7. The inverter device of claim 6, wherein, in a positive half cycle of the AC grid voltage:

when the AC grid voltage is smaller than the DC input voltage, said controller generates the first to sixth control signals in such a way that said first switch of said first converter transitions between conduction and non-conduction, said third switch of said first converter remains conducting, and said second switch of said first converter and said first to third switches of said second converter remain non-conducting, and when the AC grid voltage is greater than the DC input voltage, said controller generates the first to sixth control signals in such a way that said second switch of said first converter transitions between conduction and non-conduction, said first and third switches of said first converter remain conducting, and said first to third switches of said second converter remain non-conducting.

8. The inverter device of claim 6, wherein, in a negative half cycle of the AC grid voltage:

when an absolute value of the AC grid voltage is smaller than the DC input voltage, said controller generates the first to sixth control signals in such a way that said first switch of said second converter transitions between conduction and non-conduction, said third switch of said second converter remains conducting, and said second switch of said second converter and said first to third switches of said first converter remain non-conducting, and when the absolute value of the AC grid voltage is greater than the DC input voltage, said controller generates the first to sixth control signals in such a way that said second switch of said second converter transitions between conduction and non-conduction, said first and third switches of said second converter remain conducting, and said first to third switches of said first converter remain non-conducting.

* * * * *